N. V. HYBINETTE.
PROCESS OF ELECTROLYTIC DEPOSITION OF METALS FROM SOLUTIONS.
APPLICATION FILED MAY 22, 1913.
1,123,299.
Patented Jan. 5, 1915.
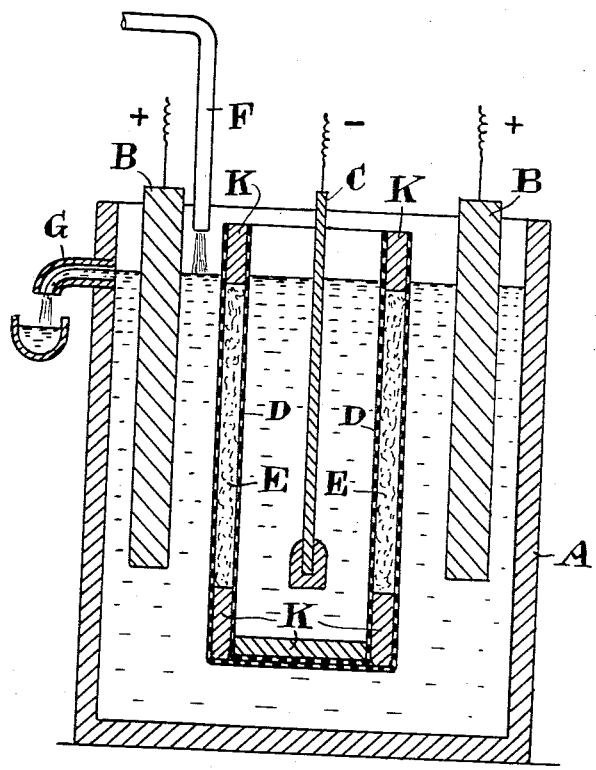

UNITED STATES PATENT OFFICE.

NOAK VICTOR HYBINETTE, OF CHRISTIANIA, NORWAY.

PROCESS OF ELECTROLYTIC DEPOSITION OF METALS FROM SOLUTIONS.

1,123,299.  Specification of Letters Patent.  Patented Jan. 5, 1915.

Application filed May 22, 1913. Serial No. 769,209.

*To all whom it may concern:*

Be it known that I, NOAK VICTOR HYBINETTE, a subject of the King of Norway, residing at Christiania, Norway, have invented certain new and useful Improvements in Processes of Electrolytic Deposition of Metals from Solutions; and I do hereby declare the following to be a full, clear, and exact description of the invention, such as will enable others skilled in the art to which it appertains to make and use the same.

This invention has for its object a process of electrolyzing copper solutions containing iron.

In processes of leaching and electrolysis for the recovery of copper from ore, where at the same time iron is present in the solution, it has been necessary to reduce the iron in the solution to the ferrous state before plating, and such reduction has involved difficulties.

I have now found a novel way to obtain plating of copper without first reducing the iron to the ferrous state. I make use of a diaphragm, separating the cathode from the anode. This diaphragm is so open and easily penetrated as to be more in the nature of a filter than a diaphragm in the real sense of that word. The apparatus described in U. S. Patent No. 1,052,256, dated February 14, 1913, is preferably used. I maintain a continuous flow of solution through the cell on the anode side only, and the solution on the cathode side can only be affected by such changes as can be transmitted through the filter by reason of diffusion of changes in specific gravity. The solution on both sides of the diaphragm may to begin with contain 20 gr. iron as ferrous sulfate, 40 gr. iron as ferric sulfate, 40 gr. copper as sulfate and 50 gr. free acid. When now the electric current is turned on, the ferric salts in solution at the cathode are reduced and copper begins to plate. This causes a decrease of specific gravity of the solution, and it rises to a level, which is higher on the cathode side than on the anode side. If now the solution on the anode side is circulated and regenerated by being passed through the copper leaching tanks so as to always be maintained at the said composition, then the solution on the cathode side will automatically adjust itself to contain say 55 gr. ferrous iron, 5 gr. ferric iron and 20 gr. copper. Copper is continually deposited at the cathode and the solution passing out of the anode compartment of the cell shows a corresponding reduction in copper contents and increase in acidity. If a sufficient amount of ferrous salts are present, part of these are also oxidized. Without any apparent reason copper is entering the cathode compartment, while ferric salts do not enter and the electric energy is therefore used to deposit copper and not to reduce ferric salts. The reason for this may be, that the copper sulfate diffuses through the filter while the iron salts do not diffuse at least not to a noticeable extent, or that certain currents are created on account of the different specific gravities, whereby certain reactions are going on in the solution. The reason for this may also be that the ferric sulfate only very slowly passes over toward the cathode in consequence of diffusion, while the copper moves toward the cathode by diffusion as well as by electrolytic movement through the solution.

It is natural, that the speed, at which the copper is plated, must be kept in reasonable relation to the speed with which the copper can come through the filter, and this again is dependent upon the concentration of copper in the anode solution.

With the concentration of solution now mentioned I use a density of 10 amperes to the square foot and obtain an efficiency of nearly 90%. The tension is in the neighborhood of 3 volts.

In the accompanying drawing a cell for use in carrying out the present process is diagrammatically illustrated.

In this drawing A is the electrolytic vat containing the electrolyte and the various parts of the cell.

B is the anode, and C the cathode, which latter is inclosed in a diaphragm bag composed of a double-walled leaden screen D secured to a wooden frame K and having a filling of asbestos or other suitable fibrous material between the walls.

F is the inlet for the electrolyte, and G the outlet.

I claim:

1. The process of electrolytic deposition of metals from solutions containing besides the metal to be recovered also considerable quantities of ferric salts; which consists in circulating the solution to be electrolyzed through the anode side of an electrolytic cell, whereby the metal to be recovered passes to the cathode without the electrolyte being circulated through the cathode chamber.

2. The process of electrolytic deposition of metals from solutions containing beside the metal to be recovered also considerable quantities of ferric salts; which comprises circulating said solution through the anode chamber while preventing circulation from the anode chamber to the cathode chamber and maintaining diffusion therebetween, the diffusion rate of the metal to be deposited being greater than the diffusion rate of the ferric salt in said solution, passing an electric current through the solution from the anode to the cathode and depositing the metal to be recovered at the cathode.

In testimony that I claim the foregoing as my invention, I have signed my name in presence of two subscribing witnesses.

NOAK VICTOR HYBINETTE.

Witnesses:
M. E. GUTTORENSEN,
RUTH LINDSTRÖM.